United States Patent
Han et al.

(10) Patent No.: US 10,756,750 B2
(45) Date of Patent: Aug. 25, 2020

(54) METHOD FOR ARRANGING CURRENT SOURCE ARRAY OF DIGITAL-TO-ANALOG CONVERTER AND LAYOUT OF COMMON-SOURCE CURRENT SOURCE ARRAY

(71) Applicant: BEIJING SPREADTRUM HI-TECH COMMUNICATIONS TECHNOLOGY CO., LTD, Beijing (CN)

(72) Inventors: Te Han, Shanghai (CN); Junshi Qiao, Shanghai (CN); Jiewei Lai, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/609,578

(22) PCT Filed: Dec. 10, 2018

(86) PCT No.: PCT/CN2018/120001
§ 371 (c)(1),
(2) Date: Oct. 30, 2019

(87) PCT Pub. No.: WO2019/114639
PCT Pub. Date: Jun. 20, 2019

(65) Prior Publication Data
US 2020/0067520 A1 Feb. 27, 2020

(30) Foreign Application Priority Data
Dec. 11, 2017 (CN) .......................... 2017 1 1316470

(51) Int. Cl.
H03M 1/66 (2006.01)
H03M 1/68 (2006.01)
G06F 30/00 (2020.01)

(52) U.S. Cl.
CPC .............. *H03M 1/68* (2013.01); *G06F 30/00* (2020.01)

(58) Field of Classification Search
CPC ............ H03M 1/68; H03M 1/66; G06F 30/00
(Continued)

(56) References Cited

U.S. PATENT DOCUMENTS 5,568,145 A * 10/1996 Reynolds ............ H03M 1/0648
341/145
6,650,265 B1 * 11/2003 Bugeja .................. H03M 1/002
341/131
(Continued)

FOREIGN PATENT DOCUMENTS

CN 101494459 A 7/2009
CN 103684457 A 3/2014
(Continued)

OTHER PUBLICATIONS

International Search Report corresponding to Appliation No. PCT/CN2018/120001; dated Mar. 8, 2019.

*Primary Examiner* — Jean B Jeanglaude
(74) *Attorney, Agent, or Firm* — Cantor Colburn LLP

(57) ABSTRACT

A method for arranging a current source array of a DAC and a layout of a common-source current source array are provided in embodiments of the present disclosure for improving linearity and related performance of the DAC. The method includes, determining a number R of rows and a number C of columns of a common-source current source array; dividing the common-source current source array into M sub-arrays; segmenting the DAC to obtain $(2^X-1)$ groups of thermometer encoding current sources and Y groups of
(Continued)

binary encoding current sources; arranging the $(2^X-1)$ groups of the thermometer encoding current sources into the M sub-arrays, arranging Y groups of binary encoding current sources into the M sub-arrays based on a number of binary encoding current sources in each of Y groups; arranging bias current sources evenly into the common-source current source array; and arranging other current sources as dummy cells.

13 Claims, 5 Drawing Sheets

(58) Field of Classification Search
USPC .......................................................... 341/144
See application file for complete search history.

(56) References Cited

U.S. PATENT DOCUMENTS

| | | | |
|---|---|---|---|
| 7,019,677 B1* | 3/2006 | Soman | H03M 1/1047 341/144 |
| 8,610,612 B2* | 12/2013 | Keramat | H03M 1/745 307/43 |
| 9,583,631 B1* | 2/2017 | Deng | H03M 7/165 |
| 2003/0227402 A1* | 12/2003 | Starzyk | H03M 1/0653 341/144 |
| 2014/0146914 A1* | 5/2014 | Kuttner | H03M 1/66 375/295 |
| 2014/0266831 A1* | 9/2014 | Chou | H03M 1/0863 341/144 |
| 2015/0042498 A1 | 2/2015 | Onody et al. | |
| 2017/0163280 A1 | 6/2017 | Deng et al. | |

FOREIGN PATENT DOCUMENTS

| | | |
|---|---|---|
| CN | 105356882 A | 2/2016 |
| CN | 105897274 A | 8/2016 |
| CN | 106209107 A | 12/2016 |

* cited by examiner

METHOD FOR ARRANGING CURRENT SOURCE ARRAY OF DIGITAL-TO-ANALOG CONVERTER AND LAYOUT OF COMMON-SOURCE CURRENT SOURCE ARRAY

CROSS-REFERENCE TO RELATED APPLICATIONS

This application is the national phase of International application No. PCT/CN2018/120001, filed on Dec. 10, 2018, which claims the benefit of priority to Chinese Patent Application No. 201711316470.9, filed on Dec. 11, 2017, the entire disclosure of which is incorporated herein by reference.

TECHNICAL FIELD

The present disclosure relates to an electrical technology field, and more particularly, to a method for arranging a current source array of a Digital-to-Analog Converter (DAC) and a layout of a common-source current source array.

BACKGROUND

Consistency of cell arrays is a key factor for determining static performance static performance, such as Differential Nonlinearity (DNL) and Integral Nonlinearity (INL), and dynamic performance, such as a Spurious-free dynamic range (SFDR) and a Signal to Noise and Distortion Ratio (SNDR), of a DAC. Therefore, in application of a high-resolution current-steering DAC, there is a high requirement on matching accuracy of current source arrays.

However, in a practical chip manufacturing process, oxide film thickness, doping, stress and other parameters usually vary with chip positions, and usually present a linear gradient change trend. In addition, when the chip is in use, different positions in the chip have different temperatures and power supply voltage drops. These non-ideal factors cause a non-random matching error of the current source array, which affects performance like linearity and resolution of the current-steering DAC. In the layout design of the current source array, specific arrangement of current source cells and bias current mirrors may significantly reduce a first-order non-random error and a second-order non-random error caused by variation of the process, temperature and voltage.

Referring to FIG. 1, FIG. 1 schematically illustrates a diagram of a layout of a common centroid current source array in the prior art. An implementation is that current source cells are symmetrically arranged in upper, lower, left and right directions in accordance with a center position of the current source array, which suppresses the non-random errors.

Compared with the current source array in a sequential arrangement, the existing common centroid array may reduce influence of the non-random error of the current source array on the performance of the DAC, but its ability to suppress the error is weak, which is still insufficient for high performance applications.

SUMMARY

Embodiments of the present disclosure provide a method for arranging a current source array of a DAC and a layout of a common-source current source array for suppressing a non-random error of the DAC, and improving linearity and related performance of the DAC.

Embodiments of the present disclosure provide a method for arranging a current source array of a current-steering DAC, wherein the DAC includes N bits, and the method includes: determining a number R of rows and a number C of columns of a common-source current source array, wherein a product of R and C is greater than ($2^N$−1); dividing the common-source current source array into M sub-arrays, wherein M>=4, M is a positive integer, and the M sub-arrays are symmetric with each other; segmenting the DAC to obtain ($2^X$−1) groups of thermometer encoding current sources and Y groups of binary encoding current sources, wherein Y is a number of lower bits of the N bits, X is a number of higher bits of the N bits, and N is a sum of X and Y; and wherein the higher bits of the N bits use a thermometer encoding manner, and the lower bits of N bits use a binary encoding manner; arranging the ($2^X$−1) groups of the thermometer encoding current sources into the M sub-arrays to make thermometer encoding current sources in each of the sub-arrays be symmetrical with thermometer encoding current sources in the other sub-arrays; arranging Y groups of binary encoding current sources into the M sub-arrays based on a number of binary encoding current sources in each of Y groups; arranging bias current sources evenly into the common-source current source array; and arranging other current sources in the common-source current source array except the binary encoding current sources, the thermometer encoding current sources, and the bias current sources as dummy cells.

Optionally, each of the ($2^X$−1) groups includes $2^Y$ thermometer encoding current source cells, and numbers of binary encoding current source cells in Y groups are $2^{Y-1}$, $2^{Y-2}$, ..., 4, 2 and 1, respectively.

Optionally, arranging the ($2^X$−1) groups of thermometer encoding current sources into the M sub-arrays to make the thermometer encoding current sources in each of the sub-arrays be symmetrical with the thermometer encoding current sources in the other sub-arrays includes: arranging $2^Y$ thermometer encoding current source cells in each of the ($2^X$−1) groups evenly into the M sub-arrays; and arranging the ($2^X$−1) groups of thermometer encoding current sources into each of the sub-arrays with a concentric manner, to make the thermometer encoding current sources in each of the sub-arrays be symmetrical with the thermometer encoding current sources in the other sub-arrays.

Optionally, arranging Y groups of binary encoding current sources into the M sub-arrays based on a number of binary encoding current sources in each of Y groups includes: when there is a first group in Y groups and a number of binary encoding current source cells in the first group is greater than or equal to M, arranging all binary encoding current source cells in the first group evenly to each of the sub-arrays, to make all binary encoding current source cells in the first group be symmetrical with respect to a central horizontal axis and a central vertical axis of the common-source current source array; when there is a second group in Y groups and a number of binary encoding current source cells in the second group is less than M, arranging all the binary encoding current source cells in the second group in a central symmetry with respect to a center of the common-source current source array; and when there is a third group in Y groups and a number of binary encoding current source cells in the third group is equal to 1, arranging the binary encoding current source cell in the third group near the central horizontal axis and the central vertical axis of the common-source current source array.

Optionally, the bias current sources are arranged in a central symmetry with respect to a center of the common source current source array, and the bias current sources are symmetrical with respect to the central horizontal axis and the central vertical axis of the common-source current source array.

Optionally, gates of all current source cells in the common-source current source array are connected to a bias voltage generated by the bias current sources, and sources of all the current source cells in the common-source current source array are connected to a power supply voltage.

Optionally, drains of all thermometer encoding current source cells in each group of the thermometer encoding current sources are connected, and drains of all the binary encoding current source cells in each group of the binary encoding current sources are connected.

Optionally, drains, sources, and gates of the dummy cells are connected to a power supply voltage.

Optionally, the bias current sources generate a bias voltage through a reference current.

Embodiments of the present disclosure provide a layout of a common-source current source array, applied to an N-bit DAC, including: M sub-arrays; wherein each of the M sub-arrays includes: $(2^X-1)$ groups of thermometer encoding current sources, Y groups of binary encoding current sources, bias current sources and dummy cells, and wherein M>=4, M is a positive integer, the M sub-arrays are symmetric with each other, each of the $(2^X-1)$ groups includes $2^Y$ thermometer encoding current source cells, numbers of binary encoding current source cells in each of Y groups are $2^{Y-1}, 2^{Y-2}, \ldots, 4, 2$ and 1, respectively, and wherein X is a number of higher bits of the N bits, Y is a number of lower bits of the N bits; and wherein the higher bits of the N bits use a thermometer encoding manner, and the lower bits of N bits use a binary encoding manner; wherein the M sub-arrays further includes: a binary encoding current source arranged based on a number of binary current source cells in each of Y groups; wherein each group of thermometer encoding current sources in each of the sub-arrays is arranged with $(2^Y/M)$ thermometer encoding current source cells, the $(2^X-1)$ groups of thermometer encoding current sources in each of the sub-arrays are arranged concentrically, and thermometer encoding current source cells in each of the sub-arrays are arranged symmetrically with thermometer encoding current source cells in the other sub-arrays; wherein the bias current sources are arranged in a central symmetry with respect to a center of the common source current source array, the bias current sources are symmetrical with respect to a central horizontal axis and a central vertical axis of the common-source current source array, and the bias current sources are configured to generate a bias voltage.

Optionally, the layout further includes: a power supply voltage; wherein the power supply voltage is connected to drains, sources, and gates of the dummy cells.

Optionally, drains of all thermometer encoding current source cells in each group of the thermometer encoding current sources are connected, and drains of all the binary encoding current source cells in each group of the binary encoding current sources are connected.

Optionally, gates of all current source cells in the common-source current source array are connected to a bias voltage generated by the bias current sources, and sources of all the current source cells in the common-source current source array are connected to a power supply voltage.

BRIEF DESCRIPTION OF THE DRAWINGS

FIG. 1 schematically illustrates a diagram of a layout of a common centroid current source array in the prior art;

FIG. 3 schematically illustrates a diagram of a layout of a common-source current source array according to an embodiment of the present disclosure;

DETAILED DESCRIPTION

Embodiments of the present disclosure provide a method for arranging a current source array of a DAC and a layout of a common-source current source array for suppressing a non-random error of the DAC, and improving linearity and related performance of the DAC.

Embodiments of the present disclosure are described clearly and completely with reference to the drawings in the present disclosure. Apparently, the described embodiments are only a part of the embodiments of the present disclosure, which are not all of the embodiments.

The terms "first", "second", "third", "fourth", etc. (if exist) in the specification and claims of the present disclosure and the drawings are configured to distinguish similar objects instead of describing a specific order or sequence. It should be understood that the numeral may be interchanged where appropriate so that the embodiments described herein may be implemented in a sequence other than what is illustrated or described herein. In addition, the terms "include" and "have" and their variation are intended to cover a non-exclusive inclusion, for example, processes, methods, systems, products, or devices including a series of steps or modules are not necessarily limited to those steps or modules, and may include other steps or modules not explicitly listed or inherent to the processes, methods, products or devices.

Figure 2:
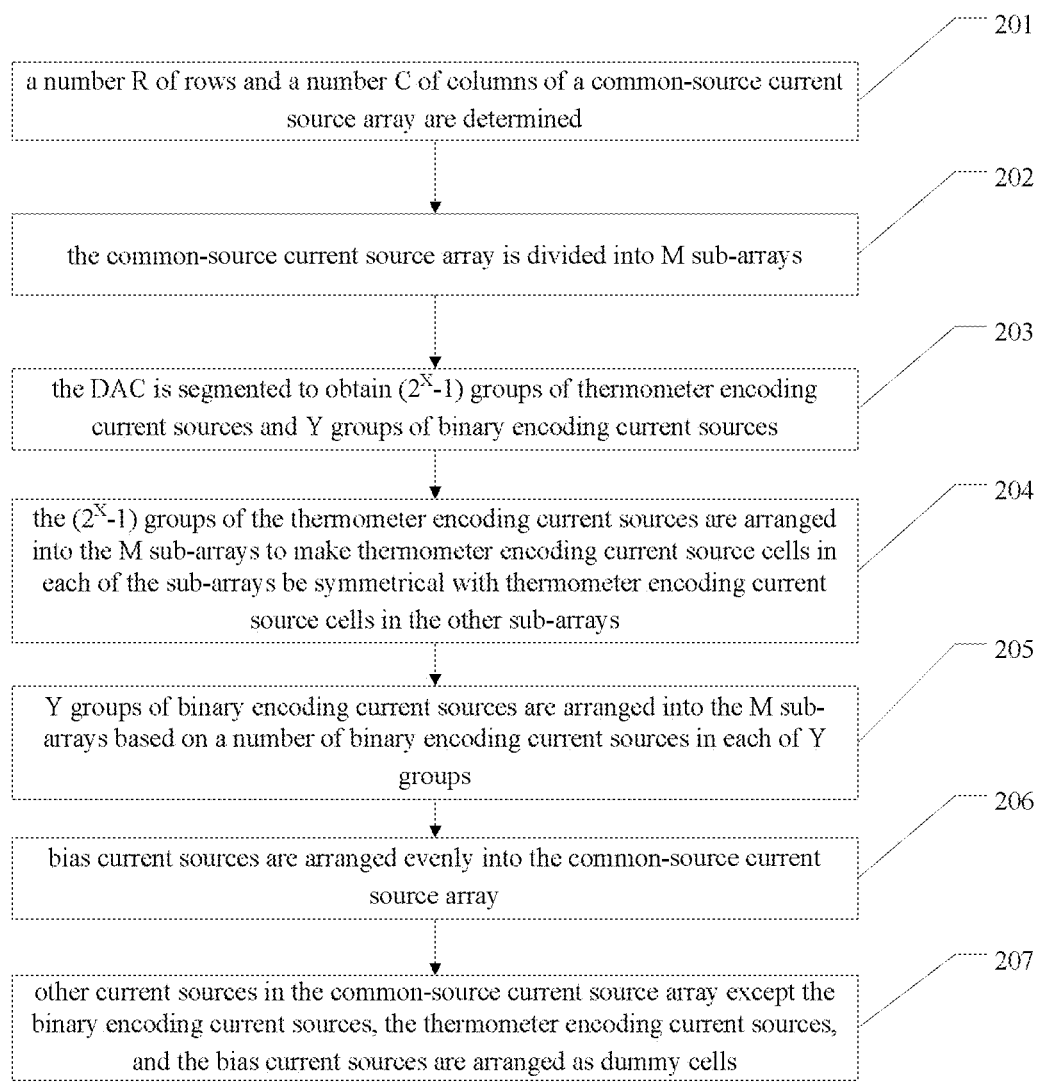
FIG. 2 schematically illustrates a flow diagram of a method for arranging a current source array of a DAC according to an embodiment of the present disclosure.

Referring to FIG. 2, FIG. 2 schematically illustrates a flow diagram of a method for arranging a current source array of a DAC according to an embodiment of the present disclosure. The DAC includes N bits, and the method includes following steps.

In 201, a number R of rows and a number C of columns of a common-source current source array are determined.

In some embodiment, the number R of rows and the number C of columns of the common-source current source array may be first determined, wherein a product of R and C is greater than $(2^N-1)$, (for example, if the DAC is a 10-bit current-steering DAC, N is 10), so as to be able to accommodate N-bit current source cells. A ratio R/C of the row number to the column number is proportional to or inversely proportional to a width-to-length ratio W/L of a current source cell transistor (according to a direction of a transistor gate), so that a lateral span and a longitudinal span of the common-source current source array are similar. The 10-bit current-steering DAC is taken as an example for illustration, the number R of rows the selected common-source current array is 48, and the number C of columns of the selected common source current arrays is 24.

In 202, the common-source current source array is divided into M sub-arrays.

In this embodiment, after the number R of rows and the number C of columns of the common source current source array are determined, the common-source current source array may be divided into M sub-arrays, wherein M>=4, and M is a positive integer. M sub-arrays are symmetrical with respect to a central horizontal axis and a central vertical axis of the common-source current source array. The 10-bit current-steering DAC is taken as an example for illustration, and the common-source current source array is divided into 4 sub-arrays that are symmetric with each other.

In 203, the DAC is segmented to obtain $(2^X-1)$ groups of thermometer encoding current sources and Y groups of binary encoding current sources.

In some embodiment, the N-bit DAC is segmented to obtain $(2^X-1)$ groups of thermometer encoding current sources and Y groups of binary encoding current sources, wherein Y is a number of lower bits of the N bits, and each of the $(2^X-1)$ groups includes $2^Y$ thermometer encoding current source cells; the X is a number of higher bits of the N bits, the N is a sum of X and Y, and numbers of binary encoding current source cells in each of Y groups are: $2^{Y-1}$, $2^{Y-2}$, ..., 4, 2, and 1 respectively. The 10-bit current-steering DAC is taken as an example for illustration, wherein N=10, the higher 5 bits use a thermometer encoding manner, and the lower 5 bits use a binary encoding manner, that is, X=5, Y=5. 31 (i.e., $2^X-1$) groups (T1~T31) of current sources correspond to the thermometer encoding manner, and each group includes 32 (i.e., $2^Y$) minimum current source cells. 5 (i.e., Y) groups (B1~B5) of current sources correspond to the binary encoding manner, and include 1, 2 4, 8 and 16 minimum current source cells, respectively.

It should be noted that, in 202, the common-source current sources can be divided into M sub-arrays, and the N-bit DAC can be segmented in step 203. However, there is no limitation in sequence between the two steps. 202 may be performed firstly, or 203 may be performed firstly, or 202 and 203 may be performed simultaneously, which are not limited.

In 204, the $(2^X-1)$ groups of the thermometer encoding current sources are arranged into the M sub-arrays to make thermometer encoding current source cells in each of the sub-arrays be symmetrical with thermometer encoding current source cells in the other sub-arrays.

In some embodiment, the $(2^X-1)$ groups of the thermometer encoding current sources are arranged evenly into the M sub-arrays. The $(2^X-1)$ groups of thermometer encoding current sources are arranged into each of the sub-arrays with a concentric manner, to make the thermometer encoding current sources in each of the sub-arrays be symmetrical with the thermometer encoding current sources in the other sub-arrays. The 10-bit current-steering DAC is taken as an example for illustration, each of the 4 sub-arrays includes 31 groups (T1~T31), of which a number of thermometer encoding current sources in each group is 8. The 31 groups of thermometer encoding current sources in each sub-array are arranged in a concentric manner, wherein the thermometer encoding current sources in each sub-array and the thermometer encoding current sources in the other three sub-arrays are symmetric with respect to the central horizontal axis and the central vertical axis of the common source current source array.

In 205, Y groups of binary encoding current sources are arranged into the M sub-arrays based on a number of binary encoding current sources in each of Y groups.

In some embodiment, when there is a first group in Y groups and a number of binary encoding current source cells in the first group is greater than or equal to M, all binary encoding current source cells in the first group are arranged evenly to each of the sub-arrays, wherein all binary encoding current source cells in the first group are symmetrical with respect to the central horizontal axis and the central vertical axis of the common-source current source array. When there is a second group in Y groups and a number of binary encoding current source cells in the second group is less than M, all binary encoding current source cells in the second group are arranged in a central symmetry with respect to a center of the common-source current source array. When there is a third group in Y groups and a number of binary encoding current source cells in the third group is equal to 1, the binary encoding current source cell in the third group is arranged near the central horizontal axis and the central vertical axis of the common-source current source array. The 10-bit current-steering DAC is taken as an example, if a number of binary encoding current source cells in the group is greater than or equal to 4 (e.g., 4, 8, 16), the binary encoding current source cells are equally divided into 4 sub-arrays, and the binary encoding current source cells are symmetrical with respect to the central horizontal axis and the central vertical axis of the common-source current source array; if the number of binary encoding current source cells in the group is less than 4 (e.g., 2), the binary encoding current source cells are arranged in a central symmetry with respect to a center of the common-source current source array; and if the number of binary encoding current source cells in the group is 1, and the binary encoding current source cell is arranged near an intersection point of the central horizontal axis and the central vertical axis of the common-source current source array.

In 206, bias current sources are arranged evenly into the common-source current source array.

In some embodiment, the bias current sources are arranged evenly in the common source current source array. Specifically, the bias current sources are evenly arranged into the sub-arrays, and the bias current sources are arranged in a central symmetry with respect to a center of the sub-arrays and are arranged symmetrically with respect to the central horizontal axis and the central vertical axis of the common-source current source array.

In 207, other current sources in the common-source current source array except the binary encoding current sources, the thermometer encoding current sources, and the bias current sources are arranged as dummy cells.

In some embodiment, after the $(2^X-1)$ groups of thermometer encoding current sources, Y groups of binary code current sources, and the bias current sources are arranged in the common-source current source array, the dummy cells may be arranged into the remaining positions in the M sub-arrays.

It should be noted that, in order to ensure a production consistency of the common-source current source array, it is required to add a plurality of rows and columns of the dummy cells at the periphery of the M sub-arrays.

It should be noted that, gates of all current source cells in the common-source current source array are connected to a bias voltage generated by the bias current sources, and sources of all current source cells in the common-source current source array are connected to a power supply voltage. Drains of all thermometer encoding current source cells in each group of the thermometer encoding current sources are connected, and drains of all binary encoding current source cells in each group of the binary encoding current sources are connected. Drains, sources, and gates of the dummy cells are connected to a power supply voltage, and the bias current sources generate a bias voltage through a reference current.

Embodiments of the present disclosure mentioned above are described in terms of the arrangement method of the current sources in the common-source current source array. Hereinafter, embodiments of the present application are described from the perspective of a layout of a common-source current source array.

Figure 3:
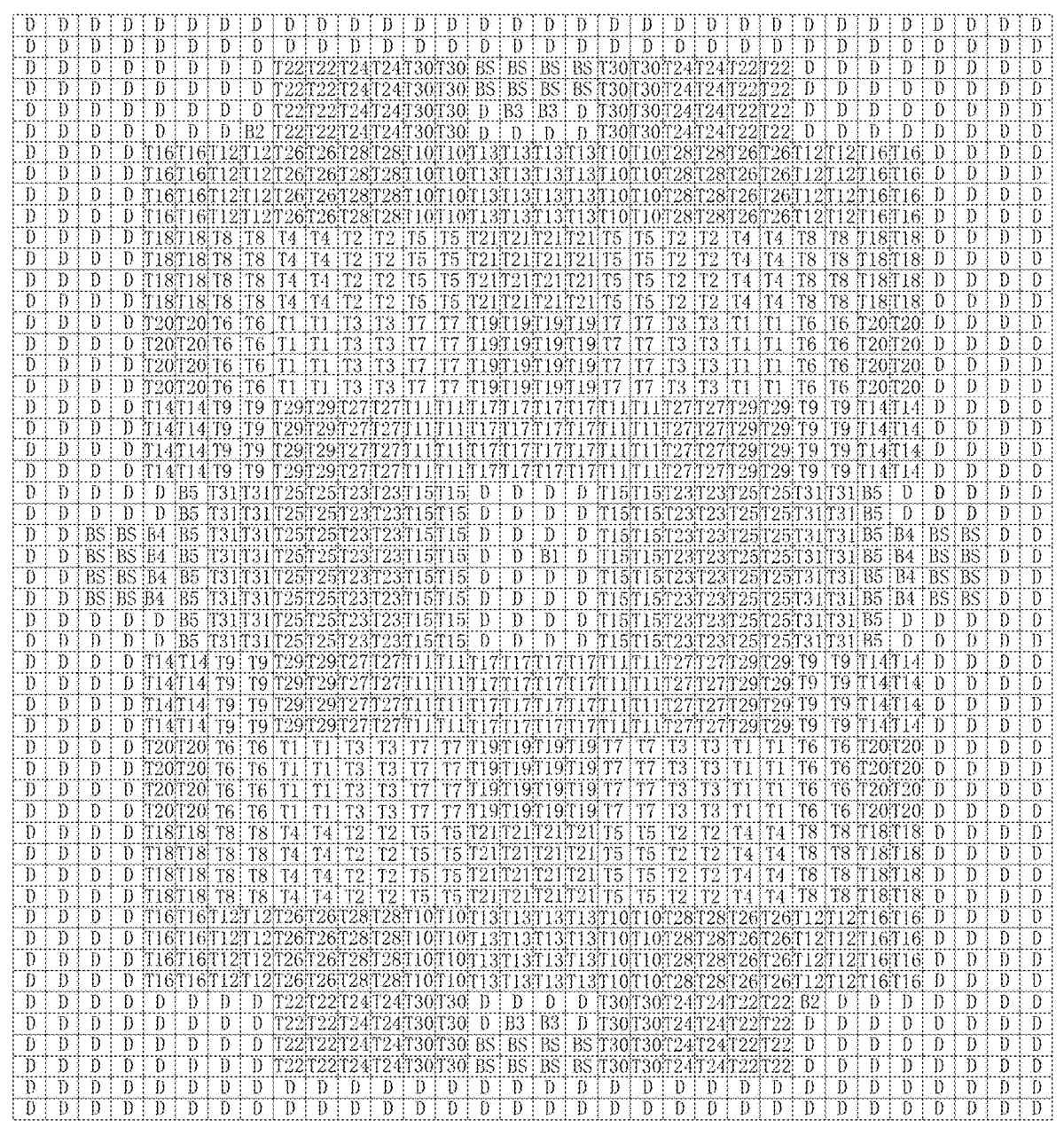

For ease of understanding, the 10-bit current-steering DAC is taken as an example for illustration in the following. Referring to FIG. 3, FIG. 3 schematically illustrates a diagram of a layout of a common-source current source array according to an embodiment of the present disclosure. The layout is applied to the 10-bit current-steering DAC, and includes M sub-arrays.

Each of the M sub-arrays includes: ($2^X-1$) groups of thermometer encoding current sources, Y groups of binary encoding current sources, bias current sources and dummy cells, and wherein M>=4, M is a positive integer, the M sub-arrays are symmetric with each other, each of the ($2^X-1$) groups includes $2^Y$ thermometer encoding current source cells, numbers of binary encoding current source cells in each of Y groups are: $2^{Y-1}, 2^{Y-2}, \ldots, 4, 2,$ and 1, respectively. X is a number of higher bits of the N bits, Y is a number of lower bits of the N bits; and wherein the higher bits of the N bits use a thermometer encoding manner, and lower bits of N bits use a binary encoding manner.

The M sub-arrays further includes: a binary encoding current source arranged based on a number of binary current source cells in each of Y groups.

Each group of thermometer encoding current sources in each of the sub-arrays is arranged with ($2^Y/M$) thermometer encoding current source cells, the ($2^X-1$) groups of thermometer encoding current sources in each of the sub-arrays are arranged concentrically, and thermometer encoding current source cells in each of the sub-arrays are arranged symmetrically with thermometer encoding current source cells in the other sub-arrays.

The bias current sources are arranged in a central symmetry with respect to a center of the common source current source array, the bias current sources are symmetrical with respect to the central horizontal axis and the central vertical axis of the common-source current source array, and the bias current sources are configured to generate a bias voltage.

Specifically, referring to FIG. 3, it can be seen that, in the layout of the common source current source array provided by embodiments of the present disclosure, a 10-bit current-steering DAC is in use, wherein N=10, the higher 5 bits use a thermometer encoding manner, and the lower 5 bits of N bits use a binary encoding manner, that is, X=5, Y=5. 31 (i.e., $2^X-1$) groups (T1~T31) of current sources correspond to the thermometer encoding manner, each group includes 32 (i.e., $2^Y$) minimum current source cells; 5 (i.e., Y) groups (B1~B5) of current sources correspond to the binary encoding manner, and each group includes 1, 2 4, 8, 16 minimum current source cells respectively. The array is divided into 4 sub-arrays. In the sub-arrays, 31 groups of the thermometer encoding current sources are arranged in a common centroid form, that is, the 31 groups of thermometer encoding current sources are arranged concentrically with respect to a center point of the sub-arrays. Further, the arrangement of the 31 groups of thermometer encoding sources is symmetrical with respect to the central horizontal axis and the central vertical axis of the entire current source array, that is, an X axis and a Y axis shown in FIG. 3.

Referring to FIG. 3, the binary encoding current source cells are divided into 5 groups. Specifically, the arrangement of the current source cells in each group is specifically as shown in FIG. 3. If the number of current source cells in the group is greater than or equal to 4, the binary encoding current source cells are equally divided into each sub-array, and the binary encoding current source cells are symmetrical with respect to the central horizontal axis and the central vertical axis of the common-source current source array (B3, B4, and B5 in FIG. 3); if the number of current source cells in the group is less than 4 (B2 in FIG. 3), the binary encoding current source cells are arranged in a central symmetry with respect to a center of the common-source current source array; if the number of binary encoding current source cells in the group is 1 (B1 in FIG. 3), and the binary encoding current source cell is arranged near the intersection point of the central horizontal axis and the central vertical axis of the common-source current source array.

Referring to FIG. 3, the bias current sources BIAS (i.e., BS in FIG. 3) are evenly arranged into each sub-array. The bias current sources are arranged in a central symmetry with respect to centers of the sub-arrays, and are symmetrical with respect to the central horizontal axis and the center vertical of the common-source current source array. The remaining cells in the common source current source array are dummy cells, which is the D as described in FIG. 3. In order to ensure the consistency of production of the current source array, it is required to add a plurality of rows and columns of the dummy cells at the periphery of the entire arrays. In FIG. 3, an example of adding 4 rows and 8 columns of dummy cells is described, and numbers of rows and columns are not limited, which can be other numbers.

In some embodiments, the common-source current source array further includes: a power supply voltage.

The power supply voltage is connected to drains, sources, and gates of the dummy cells.

In some embodiments, drains of all thermometer encoding current source cells in each group of the thermometer encoding current sources are connected, and drains of all binary encoding current source cells in each group of the binary encoding current sources are connected.

In some embodiments, gates of all the current source cells in the common-source current source array are connected to a bias voltage generated by the bias current sources, and sources of all the current source cells in the common-source current source array are connected to a power supply voltage.

The method for arranging the current sources in the common-source current source array and the layout of the common-source current source array are described above. A typical non-random error in the common-source current source array is verified hereinafter.

Figure 4A:
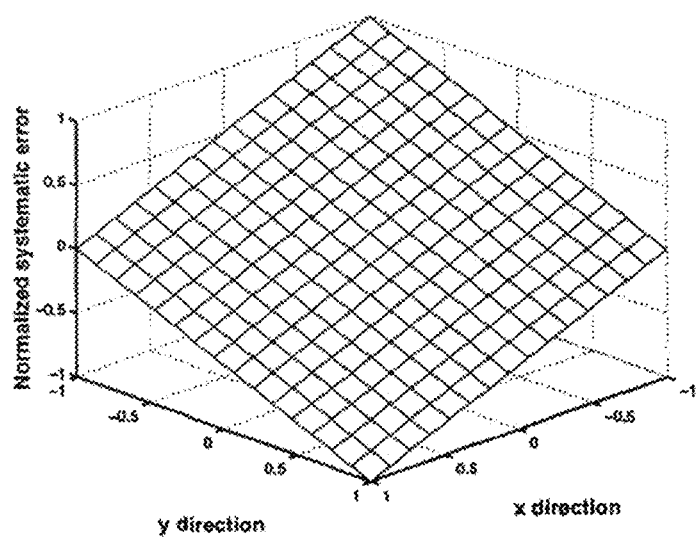
FIG. 4A schematically illustrates a diagram of a first-order linear error according to an embodiment of the present disclosure.
Figure 4B:
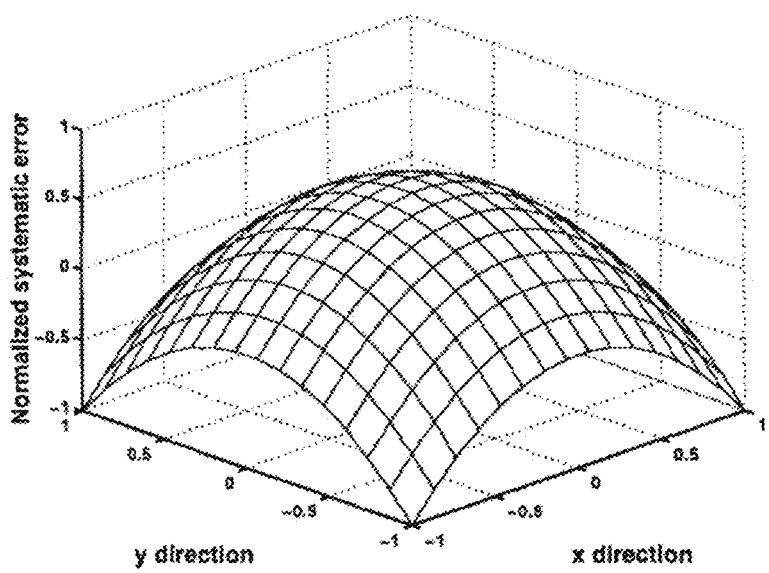
FIG. 4B schematically illustrates a diagram of a second-order parabolic error according to an embodiment of the present disclosure.
Figure 4C:
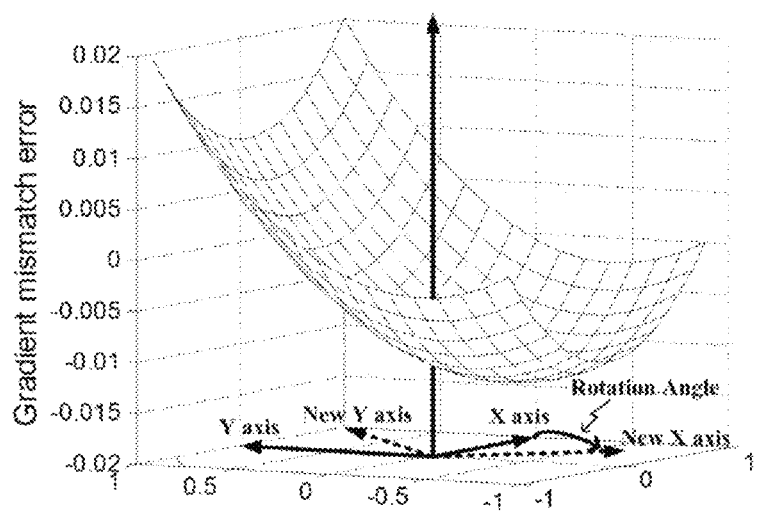
FIG. 4C schematically illustrates a diagram of a typical non-random error superimposed on the current source array of the DAC according to an embodiment of the present disclosure.

Referring to FIG. 4A-FIG. 4C, FIG. 4A schematically illustrates a diagram of a first-order linear error according to an embodiment of the present disclosure, FIG. 4B schematically illustrates a diagram of a second-order parabolic error according to an embodiment of the present disclosure, and FIG. 4C schematically illustrates a diagram of a typical non-random error superimposed on the current source array of the DAC according to an embodiment of the present disclosure, wherein the typical non-random error includes the first-order linear error and the second-order linear error.

Figure 1:
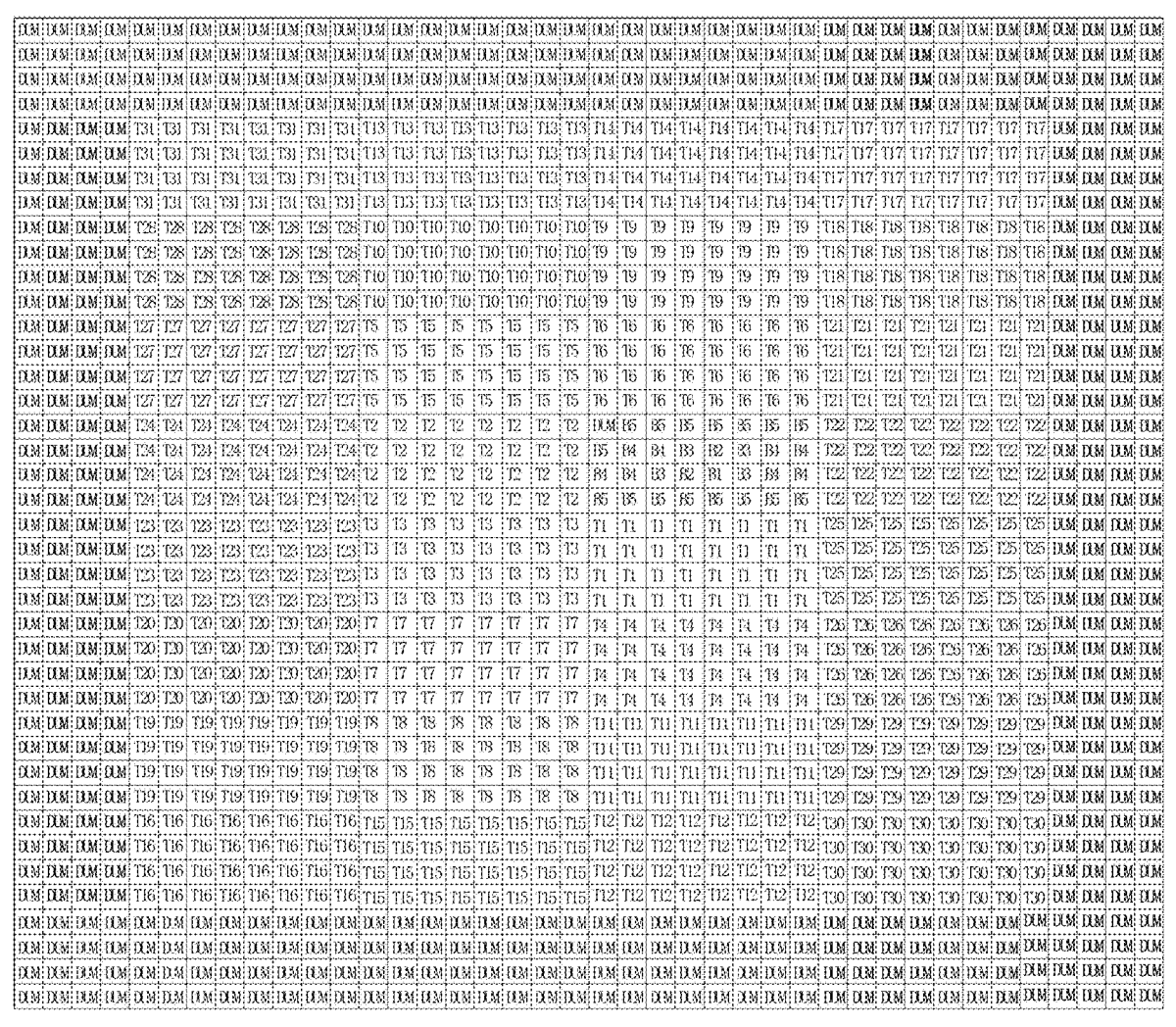

Without considering other noise sources, it is assumed that a current deviation of the current source cells caused by the first-order linear error is −5% to 5% and a current deviation of the current source cells caused by the second-order linear error is −5% to 5%. Specifically, a verification method is that FIG. 4C is superimposed on the common-source current source arrays shown in FIG. 1 and FIG. 3 respectively. When the layout of the common-source current source array provided by the prior art in FIG. 1 is in use, it is obtained that DNL=3.543 LSB, INL=8.481 LSB, SFDR=42.5 dBc, SNDR=42.14 dB of the DAC. When the layout of the common-source current source array provided by embodiments of the present disclosure in FIG. 3 is in use, it is obtained that DNL=1.186 LSB, which is reduced by 66.5%; INL=0.664 LSB, which is reduced by 92.2%; SFDR=69.6 dBc, which is increased by 27.1 dB; SNDR=59.11 dB, which is increased by of 16.97 dB (the specific verification method has been described in detail in the prior art, which is not described herein in detail, and only the result of the verification is shown here). It is shown that embodiments the present disclosure may significantly suppress the non-random error, and improve DAC linearity and related performance.

Although the present disclosure has been disclosed above with reference to preferred embodiments thereof, it should be understood that the disclosure is presented by way of example only, and not limitation. Those skilled in the art may modify and vary the embodiments without departing from the spirit and scope of the present disclosure.

What is claimed is:

1. A method for arranging a current source array of a current-steering digital-to-analog converter (DAC), wherein the DAC comprises N bits, and the method comprises:
    determining a number R of rows and a number C of columns of a common-source current source array, wherein a product of R and C is greater than $(2^N-1)$;
    dividing the common-source current source array into M sub-arrays, wherein M>=4, M is a positive integer, and the M sub-arrays are symmetric with each other;
    segmenting the DAC to obtain $(2^X-1)$ groups of thermometer encoding current sources and Y groups of binary encoding current sources, wherein Y is a number of lower bits of the N bits, X is a number of higher bits of the N bits, and N is a sum of X and Y; and wherein the higher bits of the N bits use a thermometer encoding manner, and the lower bits of N bits use a binary encoding manner;
    arranging the $(2^X-1)$ groups of the thermometer encoding current sources into the M sub-arrays to make thermometer encoding current sources in each of the sub-arrays be symmetrical with thermometer encoding current sources in the other sub-arrays;
    arranging Y groups of binary encoding current sources into the M sub-arrays based on a number of binary encoding current sources in each of Y groups;
    arranging bias current sources evenly into the common-source current source array; and
    arranging other current sources in the common-source current source array except the binary encoding current sources, the thermometer encoding current sources, and the bias current sources as dummy cells.

2. The method according to claim 1, wherein each of the $(2^X-1)$ groups comprises $2^Y$ thermometer encoding current source cells, and numbers of binary encoding current source cells in Y groups are $2^{Y-1}, 2^{Y-2}, \ldots, 4, 2$ and 1, respectively.

3. The method according to claim 1, wherein arranging the $(2^X-1)$ groups of thermometer encoding current sources into the M sub-arrays to make the thermometer encoding current sources in each of the sub-arrays be symmetrical with the thermometer encoding current sources in the other sub-arrays comprises:
    arranging $2^Y$ thermometer encoding current source cells in each of the $(2^X-1)$ groups evenly into the M sub-arrays; and
    arranging the $(2^X-1)$ groups of thermometer encoding current sources into each of the sub-arrays with a concentric manner, to make the thermometer encoding current sources in each of the sub-arrays be symmetrical with the thermometer encoding current sources in the other sub-arrays.

4. The method according to claim 1, wherein arranging Y groups of binary encoding current sources into the M sub-arrays based on a number of binary encoding current sources in each of Y groups comprises:
    when there is a first group in Y groups and a number of binary encoding current source cells in the first group is greater than or equal to M, arranging all binary encoding current source cells in the first group evenly to each of the sub-arrays, to make all binary encoding current source cells in the first group be symmetrical with respect to a central horizontal axis and a central vertical axis of the common-source current source array;
    when there is a second group in Y groups and a number of binary encoding current source cells in the second group is less than M, arranging all the binary encoding current source cells in the second group in a central symmetry with respect to a center of the common-source current source array; and
    when there is a third group in Y groups and a number of binary encoding current source cells in the third group is equal to 1, arranging the binary encoding current source cell in the third group near the central horizontal axis and the central vertical axis of the common-source current source array.

5. The method according to claim 1, wherein the bias current sources are arranged in a central symmetry with respect to a center of the common source current source array, and the bias current sources are symmetrical with respect to the central horizontal axis and the central vertical axis of the common-source current source array.

6. The method according to claim 1, wherein gates of all current source cells in the common-source current source array are connected to a bias voltage generated by the bias current sources, and sources of all the current source cells in the common-source current source array are connected to a power supply voltage.

7. The method according to claim 1, wherein drains of all thermometer encoding current source cells in each group of the thermometer encoding current sources are connected, and drains of all the binary encoding current source cells in each group of the binary encoding current sources are connected.

8. The method according to claim 1, wherein drains, sources, and gates of the dummy cells are connected to a power supply voltage.

9. The method according to claim 1, wherein the bias current sources generate a bias voltage through a reference current.

10. A layout of a common-source current source array, applied to an N-bit current-steering digital-to-analog converter (DAC), comprising:
    M sub-arrays;
    wherein each of the M sub-arrays comprises: $(2^X-1)$ groups of thermometer encoding current sources, Y groups of binary encoding current sources, bias current sources and dummy cells, and wherein M>=4, M is a positive integer, the M sub-arrays are symmetric with each other, each of the $(2^X-1)$ groups comprises $2^Y$ thermometer encoding current source cells, numbers of binary encoding current source cells in each of Y groups are $2^{Y-1}, 2^{Y-2}, \ldots, 4, 2$ and 1, respectively, and wherein X is a number of higher bits of the N bits, Y is a number of lower bits of the N bits; and wherein the higher bits of the N bits use a thermometer encoding manner, and the lower bits of N bits use a binary encoding manner;

wherein the M sub-arrays further comprises: a binary encoding current source arranged based on a number of binary current source cells in each of Y groups;

wherein each group of thermometer encoding current sources in each of the sub-arrays is arranged with $(2^Y/M)$ thermometer encoding current source cells, the $(2^X-1)$ groups of thermometer encoding current sources in each of the sub-arrays are arranged concentrically, and thermometer encoding current source cells in each of the sub-arrays are arranged symmetrically with thermometer encoding current source cells in the other sub-arrays;

wherein the bias current sources are arranged in a central symmetry with respect to a center of the common source current source array, the bias current sources are symmetrical with respect to a central horizontal axis and a central vertical axis of the common-source current source array, and the bias current sources are configured to generate a bias voltage.

11. The layout according to claim 10, further comprising: a power supply voltage;

wherein the power supply voltage is connected to drains, sources, and gates of the dummy cells.

12. The layout according to claim 10, wherein drains of all thermometer encoding current source cells in each group of the thermometer encoding current sources are connected, and drains of all the binary encoding current source cells in each group of the binary encoding current sources are connected.

13. The layout according to claim 11, wherein gates of all current source cells in the common-source current source array are connected to a bias voltage generated by the bias current sources, and sources of all the current source cells in the common-source current source array are connected to a power supply voltage.

* * * * *